US008019391B2

(12) United States Patent
Suzuki

(10) Patent No.: US 8,019,391 B2
(45) Date of Patent: Sep. 13, 2011

(54) IN-VEHICLE HANDSFREE APPARATUS

(75) Inventor: Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 401 days.

(21) Appl. No.: 12/378,706

(22) Filed: Feb. 18, 2009

(65) Prior Publication Data
US 2009/0209295 A1 Aug. 20, 2009

(30) Foreign Application Priority Data

Feb. 19, 2008 (JP) ................................. 2008-037503
Mar. 10, 2008 (JP) ................................. 2008-059573
Mar. 14, 2008 (JP) ................................. 2008-065873

(51) Int. Cl.
H04M 1/00 (2006.01)
(52) U.S. Cl. ..................................... 455/567; 455/569.2
(58) Field of Classification Search ............... 455/569.1, 455/569.2, 567
See application file for complete search history.

(56) References Cited

U.S. PATENT DOCUMENTS

| 6,067,355 | A | 5/2000 | Lim et al. |
| 6,993,367 | B2 | 1/2006 | Yamato et al. |
| 7,020,499 | B2 | 3/2006 | Moffi et al. |
| 7,274,288 | B2 | 9/2007 | Nagata |
| 7,308,289 | B2 * | 12/2007 | Sychta ........................ 455/569.1 |
| 7,327,226 | B2 | 2/2008 | Turnbull et al. |
| 7,349,722 | B2 | 3/2008 | Witkowski et al. |
| 7,376,434 | B2 * | 5/2008 | Thomas et al. ............... 455/466 |
| 7,519,399 | B2 * | 4/2009 | Suzuki ........................ 455/569.1 |
| 7,689,255 | B2 | 3/2010 | Kurauchi et al. |
| 7,873,392 | B2 | 1/2011 | Matsuda |
| 2005/0096099 | A1 | 5/2005 | Barclay et al. |
| 2005/0143054 | A1 | 6/2005 | Fogel |
| 2005/0202852 | A1 | 9/2005 | Wada |
| 2006/0040714 | A1 | 2/2006 | Suzuki |
| 2006/0172780 | A1 | 8/2006 | Krippgans |
| 2007/0026904 | A1 | 2/2007 | Matsuda |
| 2007/0037607 | A1 | 2/2007 | Matsuda |
| 2007/0066300 | A1 | 3/2007 | Nishimura et al. |
| 2007/0127654 | A1 | 6/2007 | Lin et al. |
| 2008/0039153 | A1 | 2/2008 | Katoh et al. |

(Continued)

FOREIGN PATENT DOCUMENTS

JP 07-048761 10/1987

(Continued)

OTHER PUBLICATIONS

Office Action dated Mar. 17, 2011 from corresponding U.S. Appl. No. 12/378,707.

(Continued)

*Primary Examiner* — James H Cho
(74) *Attorney, Agent, or Firm* — Harness, Dickey & Pierce, PLC

(57) ABSTRACT

An in-vehicle handsfree apparatus establishes a handsfree profile connection with each of a first cellular phone and a second cellular phone at the same time. When the first cellular phone is under telephone call, the second cellular phone receives an incoming call. The in-vehicle handsfree apparatus receives from the second cellular phone a ring tone, which is previously registered in the second cellular phone. Herein, the in-vehicle handsfree apparatus does not output the ring tone registered in the second cellular phone. Instead, the in-vehicle handsfree apparatus generates a ring tone to thereby output it in addition to a reception sound received from the first cellular phone under the telephone call.

7 Claims, 4 Drawing Sheets

U.S. PATENT DOCUMENTS

| | | |
|---|---|---|
| 2009/0209296 A1 | 8/2009 | Kimura et al. |
| 2009/0209297 A1 | 8/2009 | Suzuki |
| 2009/0209298 A1 | 8/2009 | Abeta et al. |

FOREIGN PATENT DOCUMENTS

| | | |
|---|---|---|
| JP | 09-046397 | 2/1997 |
| JP | 11-032105 | 2/1999 |
| JP | 11-068999 | 3/1999 |
| JP | 11-331328 | 11/1999 |
| JP | 2001-165668 | 6/2001 |
| JP | 2002-223288 | 8/2002 |
| JP | 2002-237869 | 8/2002 |
| JP | 2002-354109 | 12/2002 |
| JP | 2003-218996 | 7/2003 |
| JP | 2004-104298 | 4/2004 |
| JP | 2004-201249 | 4/2004 |
| JP | 2005-244875 | 9/2005 |
| JP | 2005-260822 | 9/2005 |
| JP | 2005-286553 | 10/2005 |
| JP | 2006-019908 | 1/2006 |
| JP | 2006-094477 | 4/2006 |
| JP | 2006-211365 | 8/2006 |
| JP | 2006-277827 | 10/2006 |
| JP | 2007-013541 | 1/2007 |
| JP | 2007-036678 | 2/2007 |
| JP | 2007-104343 | 4/2007 |
| JP | 2007-180947 | 7/2007 |
| JP | 2007-251455 | 9/2007 |
| JP | 2008-042717 | 2/2008 |

OTHER PUBLICATIONS

Office Action dated Dec. 22, 2009 in Japanese Application No. 2008-037503 with English translation thereof.
Office Action dated Apr. 27, 2010 in Japanese Application No. 2008-133013 with English translation thereof.
Final Office Action dated Jan. 11, 2011, in corresponding Japanese Application No. 2008-262785, with English translation thereof.
Office action dated Jan. 5, 2010 in corresponding Japanese Application No. 2008-262785.
Office Action dated Jun. 8, 2011 in corresponding U.S. Appl. No. 12/378,708.

* cited by examiner

IN-VEHICLE HANDSFREE APPARATUS

CROSS REFERENCE TO RELATED APPLICATION

This application is based on and incorporates herein by reference Japanese Patent Application No. 2008-65873 filed on Mar. 14, 2008.

FIELD OF THE INVENTION

The present invention relates to an in-vehicle handsfree apparatus capable of establishing a connection of a handsfree communication protocol with multiple cellular phones at the same time.

BACKGROUND OF THE INVENTION

Patent document 1: JP-2006-94477 A corresponding to US-2006/0040714

Patent document 1 describes an in-vehicle handsfree apparatus which establishes a handsfree profile connection with a cellular phone, which is brought into a passenger compartment of a vehicle.

Some users carry several cellular phones together for private and business uses in recent years. Thus, the inventor assumes that an in-vehicle handsfree apparatus might be required to anticipate a case that multiple cellular phones are brought into a passenger compartment of the relevant vehicle. In other words, the inventor assumes that an in-vehicle handsfree apparatus might be required which has a function to establish a handsfree profile connection with each of the multiple cellular phones at the same time (referred to as a function for multi-profile connection) to thereby allow all the cellular phones to be in a handsfree standby state.

Further, even if an in-vehicle handsfree apparatus might be provided with such a function for multi-profile connection with multiple cellular phones as the inventor assumes, a situation might be assumed that while one of the cellular phones with which a handsfree profile connection is being simultaneously established is under a telephone call, another cellular phone may receive an incoming call. In such a situation, the inventor further assumes that if the cellular phone receiving the incoming call is compliant with an in-band ring tone, the in-vehicle handsfree apparatus necessarily receives a ring tone registered in the cellular phone receiving the incoming call and the received ring tone might be outputted along with a reception sound received from the cellular phone under the telephone call. This might cause a trouble in hearing the reception sound under the telephone call, resulting in worsening the usability.

SUMMARY OF THE INVENTION

It is an object of the present invention to provide an in-vehicle handsfree apparatus having a function to establish a handsfree communication protocol connection with multiple cellular phones such that a user is enabled to appropriately hear reception sounds received from a first cellular phone under telephone call and to be appropriately notified during the telephone call of the first cellular phone that a second cellular phone has received an incoming call.

As an example of the present invention, an in-vehicle handsfree apparatus is provided as follows. A handsfree connection section is configured to establish a handsfree communication protocol connection with a cellular phone. A ring tone reception section is configured to receive a ring tone registered in a cellular phone, with which the handsfree connection section establishes a handsfree communication protocol connection. A control section is configured to (i) output by using a reception sound output section a reception sound which is received from a cellular phone, which is under telephone call and with which the handsfree connection section establishes a handsfree communication protocol connection, and (ii) output, when a cellular phone with which the handsfree connection section establishes a handsfree communication protocol connection receives an incoming call, a ring tone using a ring tone output section, the ring tone being received by the ring tone reception section from and registered in the cellular phone receiving the incoming call. A ring tone generation section is configured to generate a ring tone. Herein, the control section is further configured to (i) establish a handsfree communication protocol connection with a plurality of cellular phones including at least a first cellular phone and a second cellular phone simultaneously, and (ii) then output, in case that the second cellular phone receives an incoming call when the first cellular phone is under telephone call, (a) a reception sound, which is received from the first cellular phone under the telephone call, via the reception sound output section, and, simultaneously, (b) a ring tone, which is generated by the ring tone generation section, via the ring tone output section, without outputting a ring tone, which is received by the ring tone reception section from the second cellular phone and registered in the second cellular phone which is receiving the incoming call.

Thus, even if the apparatus receives a ring tone, which is registered in the second cellular phone, the received ring tone is not outputted. Instead, another ring tone which is generated by the ring tone generation section is outputted along with the reception sound received from the first cellular phone under the telephone call. Such a generated ring tone can be registered or designed such that a user can be notified of an incoming call without having a trouble in hearing the reception sound. For example, it can be designed as a monotone sound of a predetermined frequency band. As a result, a user is enabled to appropriately hear reception sounds received by the first cellular phone under telephone call and to be notified during the telephone call of the first cellular phone that the second cellular phone has received an incoming call.

As another example of the present invention, a method is provided for an in-vehicle handsfree apparatus to notify an incoming call reaching one of cellular phones, with which the in-vehicle handsfree apparatus establishes a handsfree communication protocol connection. The method comprises: (i) establishing a handsfree communication protocol connection with a plurality of cellular phones including at least a first cellular phone and a second cellular phone; (ii) receiving a reception sound received from the first cellular phone, which is under telephone call; (iii) receiving a notice of an incoming call along with a registered ring tone from the second cellular phone when the second cellular phone receives the incoming call during the telephone call of the first cellular phone, the registered ring tone being previously registered in the second cellular phone, to thereby generate a ring tone for indicating the incoming call reaching the second cellular phone; and (iv) outputting, together with the reception sound received from the first cellular phone, the generated ring tone for indicating the incoming call reaching the second cellular phone, without outputting the registered ring tone received from the second cellular phone, while receiving (a) the reception sound from the first cellular phone under the telephone call and (b) the notice of the incoming call from the second cellular phone.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
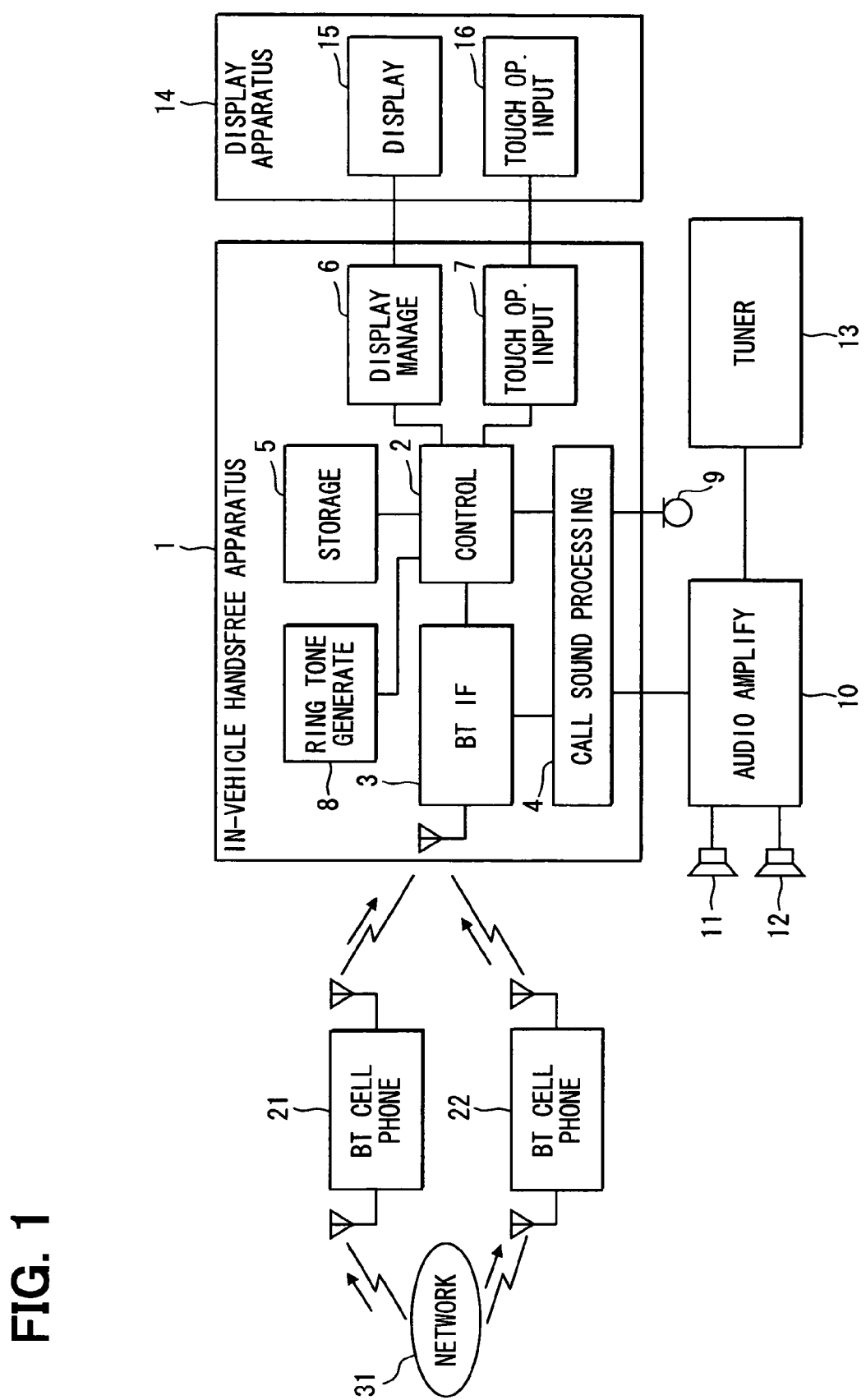
FIG. 1 is a functional block diagram illustrating an overall configuration of an in-vehicle handsfree apparatus according to an embodiment of the present invention.

An embodiment according to the present invention will be explained with reference to drawings. The following explains an example, in which each of multiple cellular phones has a Bluetooth (registered trademark, referred to as BT) communication function and the multiple cellular phones are brought in a passenger compartment of a relevant vehicle.

An in-vehicle handsfree apparatus 1 according to an embodiment of the present invention is mounted in a vehicle and includes a control section 2, a BT interface section 3, a call sound processing section 4, a storage section 5, a display management section 6, a touch operation input section 7, and a ring tone generation section 8. The control section 2 may function as an example of an interruption incoming call notice designation means or portion. The BT interface section 3 may function as an example of a handsfree connection means or section, a ring tone reception means or section.

The control section 2 includes a CPU, RAM, ROM, I/O bus, etc., and controls an overall operation of the in-vehicle handsfree apparatus 1 such as a communication operation, a data control operation, etc. The BT interface section 3 is compliant with several profiles standardized by the communication standard of the BT such as a handsfree profile (HFP) for a handsfree telephone call and a phonebook access profile (PBAP) for transmission of telephone book data, historical outgoing call data, or historical incoming call data. The BT interface section 3 is further capable of multi-profile connection, which allows the BT interface section 3 to establish a connection of a handsfree profile simultaneously with each of two or more cellular phones compliant with the BT (referred to as a BT-compliant cellular phone).

For instance, the following takes place. A first cellular phone 21 and a second cellular phone 22 have a BT communication function. Both cellular phones 21, 22 together are brought in the passenger compartment of the vehicle. Herein, the first cellular phone 21 and the second cellular phone 22 are only two examples of BT-compliant cellular phones, with which the BT interface section 3 is allowed to establish a connection of a handsfree profile simultaneously. If the first cellular phone 21 and the second cellular phone 22 exist within the BT communication area covered by the BT interface section 3, the BT interface section 3 establishes a handsfree profile connection with the first cellular phone 21 and the second cellular phone 22 at the same time. Herein, the above profiles signify communication protocols defined for every function.

The call sound processing section 4 is connected with a microphone 9 and an audio amplifier 10. The microphone 9 is arranged at a position to easily collect user's utterance, for instance, in a vicinity of a steering wheel in the passenger compartment. The audio amplifier 10 is arranged separately outside of the in-vehicle handsfree apparatus 1. When performing a handsfree telephone call using one of the first and second cellular phones 21, 22 brought in the passenger compartment, the call sound processing section 4 operates the following. When receiving a sound which the user utters as a transmit sound via the microphone 9, the call sound processing section 4 operates speech processing of the received transmit sound and outputs it to the BT interface section 3. When receiving a reception sound via the BT interface section 3, the call sound processing section 4 outputs the received reception sound to the audio amplifier 10. When the audio amplifier 10 receives the reception sound from the call sound processing section 4, the audio amplifier 10 amplifies the received reception sound and outputs the amplified sound via speakers 11, 12, which may function as examples of a reception sound output section.

The speaker 11 and the speaker 12 are arranged symmetrically with respect to the full length direction of the vehicle mounted with the in-vehicle handsfree apparatus 1. For example, the speaker 11 is arranged at the driver's seat door, while the speaker 12 is arranged at the front passenger door. In addition, the audio amplifier 10 is also connected to a tuner deck 13. For instance, the tuner deck 13 receives a musical tune sound from a storage medium for music, or a radio program from a radio station and outputs them to the audio amplifier 10. The audio amplifier 10 amplifies the received musical tune sound and the radio program and outputs the amplified sounds via the speakers 11, 12.

The storage section 5 can store various data such as: phonebook data indicating correspondence between phone numbers and registration names; historical outgoing call data indicating correspondence between outgoing call clock times and destination phone numbers with respect to outgoing calls from the in-vehicle handsfree apparatus 1 or cellular phones 21, 22 with which a handsfree profile connection is established; and historical incoming call data indicating correspondence between incoming call clock times and source phone numbers with respect to incoming calls to cellular phones 21, 22 with which the in-vehicle handsfree apparatus 1 establishes a handsfree profile connection. Herein, an outgoing call or an incoming call can be also referred to as an outgoing call or incoming call, respectively.

A display apparatus 14 includes (i) a display device 15 having a screen for displaying a display window and (ii) a touch operation input device 16, which is formed on the screen. Herein, the touch operation input device 16 may function as an example of a selection operation section or means for (i) different phone interruption incoming call notice or (ii) a ring tone. The display management section 6 controls a display operation of the display device 15 based on a display command signal, which is received from the control section 2. The touch operation input section 7 receives an operation detection signal via the touch operation input device 16 according to the user having operated the touch switch currently formed on the display screen. The touch operation input section 7 outputs the received operation detection signal to the control section 2. The control section 2 analyzes and processes the received operation detection signal.

Herein, the user can select either a validity mode or an invalidity mode with respect to the different phone interruption incoming call notice by operating the touch switch. Thereby, the user can determine whether to be notified of the interrupting incoming call to one of the cellular phones 21, 22 while the other is under telephone call (i.e., in a calling state). Either the validity mode or invalidity mode, which the user selected by operating the touch switch, is constantly being designated by the control section 2.

The ring tone generation section 8 generates a monotone sound having a predetermined frequency band as a ring tone. Herein, the user can select one of multiple ring tones by operating the touch switch. The control section 2 generates the ring tone which the user selected by using the ring tone generation section 8.

The cellular phones 21, 22 have types of being compliant and not compliant with an in-band ring tone (in other words, types of supporting or not supporting an in-band ring tone). The type being compliant with an in-band ring tone signifies the type having a function to transmit a ring tone while the type not being compliant signifies the type having no function to transmit a ring tone. That is, if each of the cellular phone 21 and the cellular phone 22 is compliant with the in-band ring tone, the following takes place. The cellular phone 21, 22 receives an incoming call (i.e., receives a signal of the incoming call) from the cellular phone network 31 under the state in which the handsfree profile connection is established with the in-vehicle handsfree apparatus 1. The cellular phone 21, 22 then transmits identification information (for example, telephone number registered inside) and an incoming call notice signal to the in-vehicle handsfree apparatus 1, and, furthermore, transmits a ring tone registered inside to the in-vehicle handsfree apparatus 1. In contrast, if each of the cellular phone 21 and the cellular phone 22 is not compliant with the in-band ring tone, the following takes place. The cellular phone 21, 22 receives an incoming call signal from the cellular phone network 31 under the state in which the handsfree profile connection is established with the in-vehicle handsfree apparatus 1. Although the cellular phone 21, 22 then transmits identification information and an incoming call notice signal to the in-vehicle handsfree apparatus 1, the cellular phone 21, 22 does not transmit a ring tone registered inside to the in-vehicle handsfree apparatus 1.

When the control section 2 receives the ring tone together with the incoming call notice signal and identification information from the cellular phone 21, 22, the control section 2 outputs the received ring tone (ring tone registered in the cellular phone 21, 22) via the speakers 11, 12. It is thus reported or notified that the cellular phone 21, 22 has received an incoming call signal. In contrast, when the control section 2 receives no ring tone along with the incoming call notice signal and identification information from the cellular phone 21, 22, the control section 2 generates a ring tone by using the ring tone generation section 8. The control section 2 outputs the generated ring tone via the speakers 11, 12 to thereby report that the cellular phone 21, 22 has received an incoming call.

Figure 2:
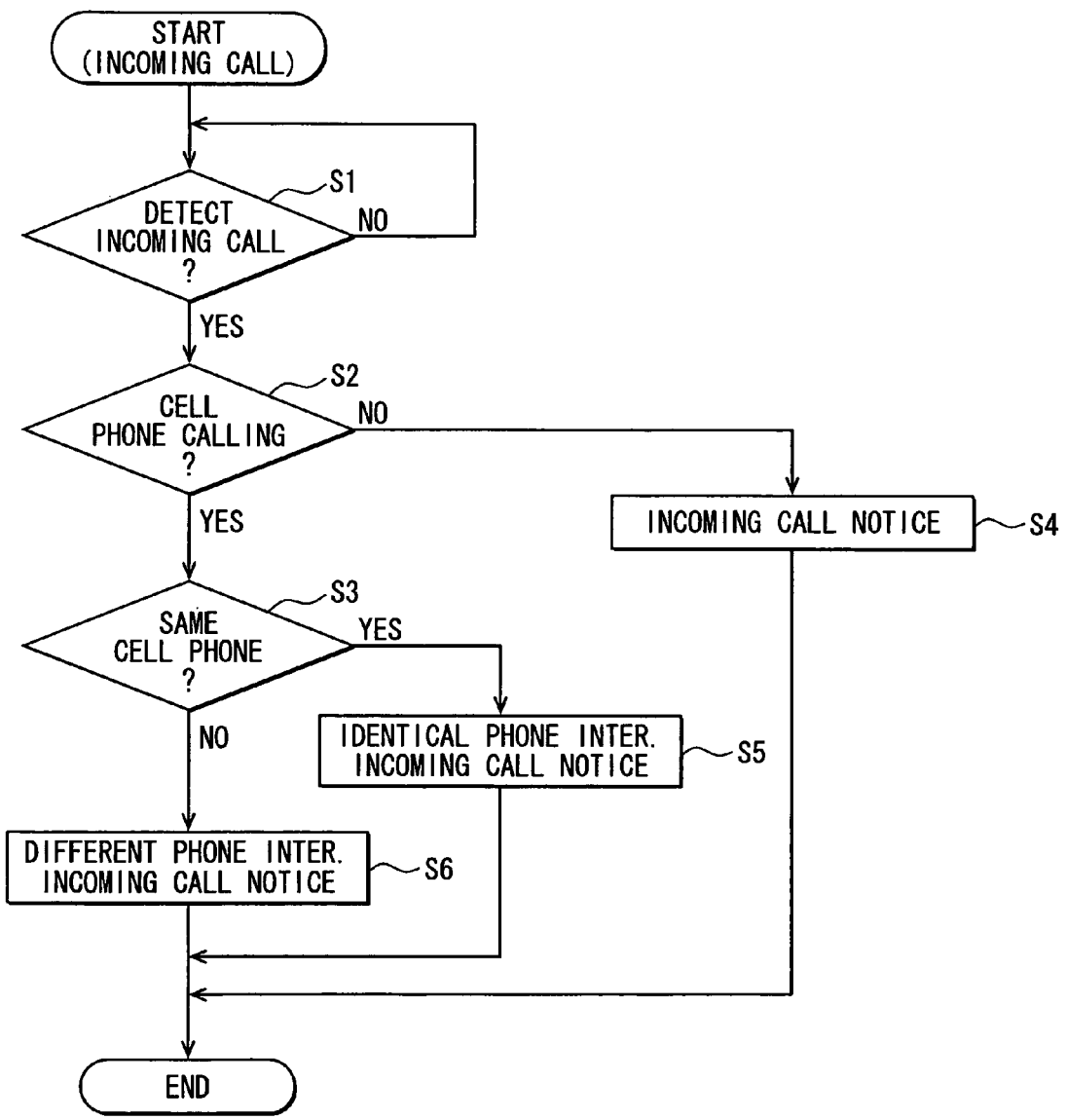
FIGS. 2, 3 are flowchart diagrams illustrating processes executed by a control section of the in-vehicle handsfree apparatus.
Figure 3:
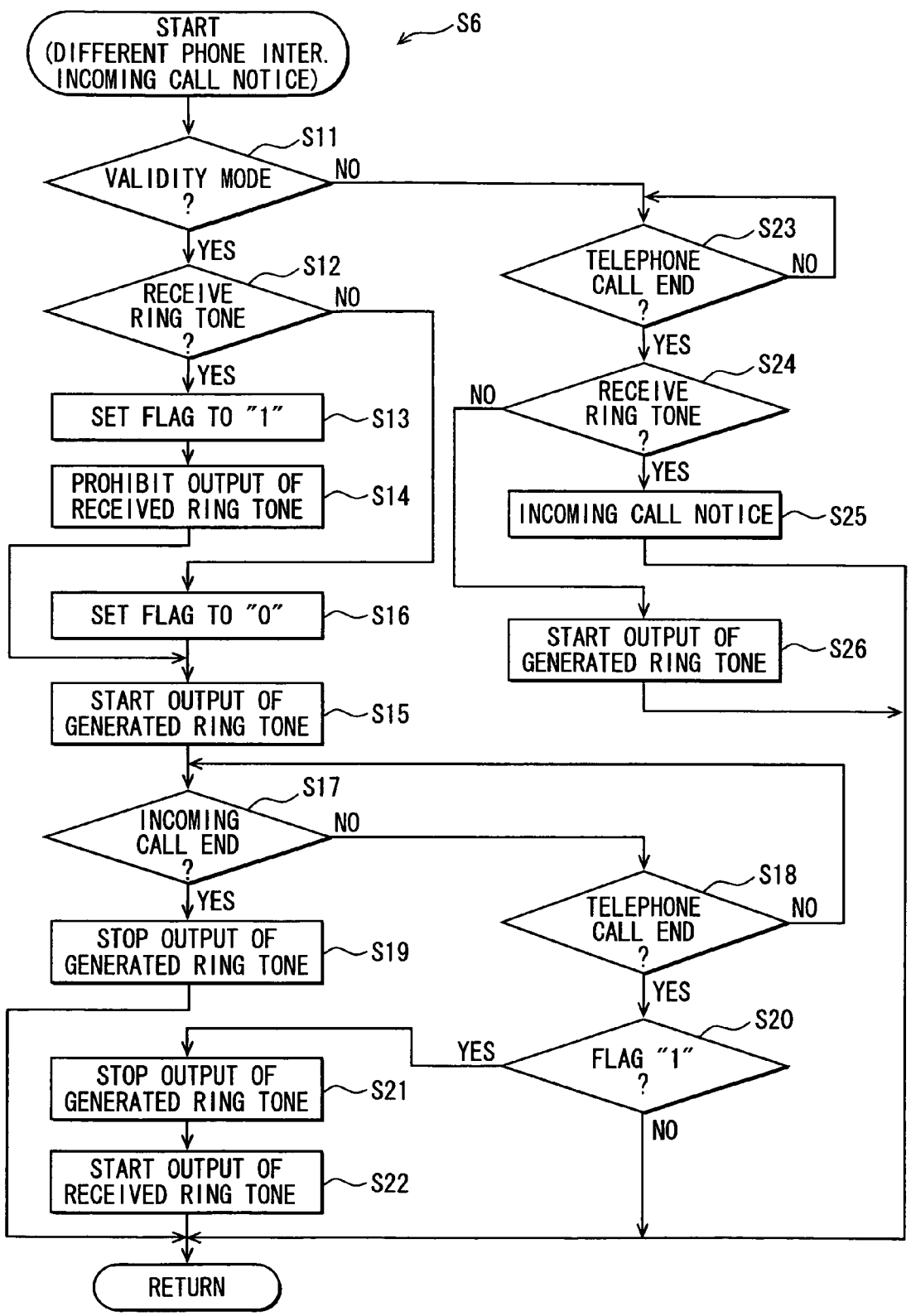
Figure 4:
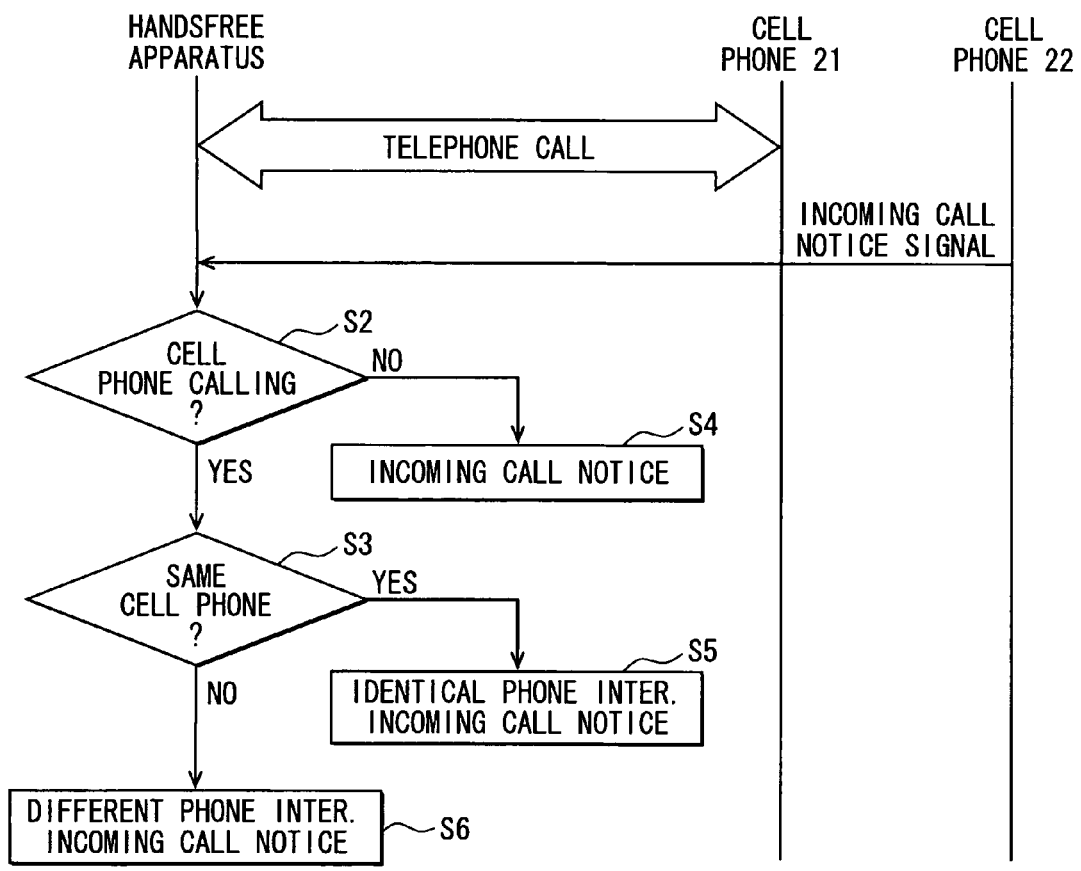
FIG. 4 is a sequence diagram of a process by the control section.

An operation under the above configuration is explained with reference to FIGS. 2, 3, and 4. FIGS. 2, 3 illustrate flowcharts of processes executed by the control section 2 of the in-vehicle handsfree apparatus 1.

In the in-vehicle handsfree apparatus 1, the control section 2 starts an incoming call process. At S1, it is first determined whether the BT interface section 3 has received an incoming call notice signal from either the cellular phone 21 or the cellular phone 22. It is thus determined whether either the cellular phone 21 or the cellular phone 22 has received an incoming call signal.

When it is determined that either has received an incoming call signal (S1: YES), it is determined whether any cellular phone being under telephone call (i.e., executing a telephone call or being in a calling state) exists presently at S2. When it is determined that the cellular phone under the telephone call does not exist presently (S2: NO), the processing proceeds to a notice process (at S4) of an incoming call.

In contrast, when it is determined that the cellular phone under telephone call exists presently (S2: YES), it is determined at S3 whether the cellular phone under the telephone call is the same as that having received an incoming call signal based on whether the identification information which is received from the cellular phone under the telephone call is the same as that which is received from the cellular phone having received an incoming call signal. The control section 2 determines that the identification information which is received from the cellular phone under the telephone call is the same as that which is received from the cellular phone having received an incoming call signal to thereby determine that the cellular phone under the telephone call is the same as that having received an incoming call signal (S3: YES). The processing then proceeds to a notice process (S5) of an identical phone interruption incoming call. In contrast, the control section 2 determines that the identification information which is received from the cellular phone under telephone call is not the same as that which is received from the cellular phone having received an incoming call signal to thereby determine that the cellular phone under the telephone call is different from that having received an incoming call signal (S3: NO). The processing proceeds to a notice process (S6) of a different phone interruption incoming call.

That is, the identical phone interruption incoming call notice process signifies a notice process executed at the following case. When the in-vehicle handsfree apparatus 1 establishes a handsfree profile with at least cellular phones 21, 22, a first cellular phone 21 of the cellular phones 21, 22 is under telephone call, and the same first cellular phone 21 receives an incoming call (i.e., an incoming call signal) under the telephone call. In contrast, the different phone interruption incoming call notice process signifies a notice process executed at the following case. When the in-vehicle handsfree apparatus 1 establishes a handsfree profile with at least cellular phones 21, 22, a first cellular phone 21 of the cellular phones is under telephone call, and a second cellular phone 22 different from the first cellular phone 21 receives an incoming call while the first cellular phone 21 is still under the telephone call.

The different phone interruption incoming call notice process is explained below. FIG. 4 illustrates a case that when a first cellular phone 21 is already during a telephone call, a second cellular phone 22 receives an incoming call signal. Note that any one of cellular phones with which the handsfree apparatus 1 establishes a handsfree profile can be the above first cellular phone 21 or the second cellular phone 22.

After the control section 2 proceeds to the different phone interruption incoming call notice process, it determines at S11 whether the different phone interruption incoming call notice is designated to be in the validity mode or invalidity mode. When it is determined that the different phone interruption incoming call notice is designated to be in the validity mode (S11: YES), it is then determined at S12 whether the BT interface section 3 has received a ring tone registered in the second cellular phone 22 having received an incoming call signal.

When the second cellular phone 22 is compliant with an in-band ring tone, the control section 2 naturally determines that the BT interface section 3 has received a ring tone registered in the second cellular phone 22 (S12: YES). The control section 2 then sets an in-band ring tone flag as "1" at S13 and prohibits outputting of the ring tone, which is received by the BT interface section 3 from the second cellular phone 22 at S14. Instead, the ring tone generation section 8 is caused to generate a monotone sound having a predetermined frequency band as a ring tone. The ring tone generated by the ring tone generation section 8 is then outputted via the speakers 11, 12 at S15.

In contrast, when the second cellular phone 22 is not compliant with an in-band ring tone, the control section 2 determines that the BT interface section 3 has not received a ring tone registered in the second cellular phone 22 (S12: NO). The control section 2 then sets the in-band ring tone flag as "0" at S16. The ring tone generation section 8 is then caused to generate a monotone sound having a predetermined frequency band as a ring tone. The ring tone generated by the ring tone generation section 8 is then outputted via the speakers 11, 12 at S15.

In other words, even if the in-vehicle handsfree apparatus 1 receives from the second cellular phone 22 a ring tone (or an incoming notice tone) registered in the second cellular phone 22, at the same time when the reception sound is outputted because of the telephone call taking place in the first cellular phone 21 via the speakers 11, 12, the ring tone generated by the in-vehicle handsfree apparatus 1 is outputted, instead of outputting the ring tone registered in the second cellular phone 22 having received an incoming call signal.

Subsequently, the control section 2 determines at S17 whether the incoming call signal to the second cellular phone 22 ends or not. It is further determined at S18 whether the telephone call of the first cellular phone 21 is completed. When the control section 2 determines that the incoming call signal to the second cellular phone 22 ends before the telephone call of the first cellular phone 21 is completed (S17: YES), it stops outputting of the ring tone generated by the ring tone generation section 8 via the speakers 11, 12 at S19. The control section 2 ends the notice that the second cellular phone 22 has received an incoming call signal, and returns the processing.

In contrast, when the control section 2 determines that the telephone call of the first cellular phone 21 is completed before the incoming call signal to the second cellular phone 22 ends (S18: YES), it is determined whether the in-band ring tone flag is set to "1" or "0" at S20. When the control section 2 determines that the in-band ring tone flag has been set to "1," the control section 2 determines that the BT interface section 3 has received a ring tone registered in the second cellular phone 22 (S20: YES). The control section 2 stops outputting of the ring tone generated by the ring tone generation section 8 via the speakers 11, 12 at S21. The control section 2 starts outputting of the ring tone, which is received by the BT interface section 3 from the second cellular phone 22, via the speakers 11, 12 at S22. The processing is then returned. In such a case, via the speakers 11, 12, instead of the ring tone generated by the in-vehicle handsfree apparatus 1, the ring tone, which is registered in the second cellular phone 22 having received an incoming call signal, is outputted.

In contrast, when the control section 2 determines that the in-band ring tone flag has been set to "0," the control section 2 determines that the BT interface section 3 has not received a ring tone registered in the second cellular phone 22 (S20: NO). The control section 2 continues outputting of the ring tone generated by the ring tone generation section 8 via the speakers 11, 12. The processing is then returned.

When the control section 2 determines that the different phone interruption incoming call notice is designated to be in the invalidity mode (S11: NO), it is determined at S23 whether the telephone call of the first cellular phone 21 is completed. When it is determined that the telephone call of the first cellular phone 21 is completed (S23: YES), it is determined at S24 whether the BT interface section 3 has received a ring tone, which is registered in the second cellular phone 22 having received an incoming call signal.

When the second cellular phone 22 is compliant with an in-band ring tone, the control section 2 determines that the BT interface section 3 has received a ring tone registered in the second cellular phone 22 (S24: YES). The control section 2 starts outputting of the ring tone, which is received by the BT interface section 3 from the second cellular phone 22, via the speakers 11, 12 at S25. The processing is then returned. In such a case, the ring tone registered in the second cellular phone 22 having received an incoming call signal is outputted via the speakers 11, 12 for the first time.

In contrast, when the second cellular phone 22 is not compliant with an in-band ring tone, the control section 2 determines that the BT interface section 3 has not received a ring tone registered in the second cellular phone 22 (S24: NO). The ring tone generation section 8 is caused to generate a monotone sound having a predetermined frequency band as a ring tone. The ring tone generated by the ring tone generation section 8 is then outputted via the speakers 11, 12 at S26. The processing is then returned. In such a case, the ring tone which the in-vehicle handsfree apparatus 1 generates by itself is outputted via the speakers 11, 12 for the first time.

Incidentally, when the cellular phone 21 under telephone call receives an incoming call signal, the control section 2 switches to execute an identical phone interruption incoming call notice process at S5. If the cellular phone 21 contracts an interruption incoming call notice service which the cellular phone network 31 provides, a ring tone, which is specified in the service and transmitted from the cellular phone network 31, is outputted via the speakers 11, 12. That is, the ring tone is outputted via the speakers 11, 12 at the same time along with the reception sound taking place under the telephone call of the cellular phone 21. In this case, the outputted ring tone is a ring tone specified in the interruption incoming call notice service instead of the ring tone registered in the cellular phone 22 or the ring tone generated by the in-vehicle handsfree apparatus 1.

From such a background, (i) the ring tone generated by the in-vehicle handsfree apparatus 1 itself in the different phone interruption incoming call notice process and (ii) the ring tone in the identical phone interruption incoming call notice process are desirably different from each other, for instance, in frequency band or output pattern. Such a desired configuration can achieve the user's appropriate recognition with respect to not only an incoming call, but also, whether an incoming call is arriving at a first cellular phone under telephone call or a second cellular phone different from the first cellular phone.

The above explains the case that when the first cellular phone 21 is under telephone call, the second cellular phone 22 receives an incoming call signal. However, by contrast, another case can be explained that when the second cellular phone 22 is under telephone call, the first cellular phone 21 receives an incoming call signal.

As the mentioned above, the in-vehicle handsfree apparatus 1 according to the present embodiment is provided as follows. A handsfree profile is connected by the in-vehicle handsfree apparatus 1 at the same time with at least a first cellular phone 21 and a second cellular phone 22. In other words, the in-vehicle handsfree apparatus 1 establishes a handsfree profile with at least a first cellular phone 21 and a second cellular phone 22. Herein, it is assumed that while the first cellular phone 21 is under telephone call, the second cellular phone 22 receives an incoming call (i.e., incoming call signal). Even if the in-vehicle handsfree apparatus 1 receives from the second cellular phone 22 a ring tone (i.e., an incoming call tone) registered in the second cellular phone 22, the received ring tone registered in the second cellular phone 22 is not outputted. Instead, a ring tone generated by the in-vehicle handsfree apparatus 1 is outputted along with a reception sound received from the first cellular phone 21, which is under the telephone call. Under such a configuration, a generated ring tone can be registered such that a user has no trouble to hear the reception sound while being notified of the incoming call of another cellular phone. Thus, the user can appropriately hear the reception sound received from the first cellular phone 21 under the telephone call, and appropriately recognize that the second cellular phone 22 receives an incoming call. This enhances the user's usability.

Moreover, the different phone interruption incoming call notice can be settable to either the validity mode or invalidity mode. In the validity mode, the user can appropriately hear the reception sound received from the first cellular phone 21 under the telephone call, and recognize that the second cellular phone 22 has received an incoming call. In the invalidity mode, the user can be prevented from recognizing that the second cellular phone 22 has received an incoming call, and concentrate on the telephone call.

Furthermore, when the incoming call to the second cellular phone 22 continues and the first cellular phone 21 closes the telephone call, the following takes place. If the ring tone registered in the second cellular phone 22 is received from the second cellular phone 22, the ring tone generated by the in-vehicle handsfree apparatus 1 is not outputted but the ring tone registered in the second cellular phone 22 is outputted. Thus, the user can securely recognize that the second cellular phone 22 has received an incoming call.

The present invention is not limited only to the above-mentioned embodiment, and can be modified or extended as follows. The function of the in-vehicle handsfree apparatus 1 may be included in another in-vehicle apparatus, such as an in-vehicle navigation apparatus. The ring tone transmitted to the in-vehicle handsfree apparatus 1 from the cellular phone 21, 22 may be a musical tune (so called "incoming melody"). When the in-vehicle handsfree apparatus 1 registers cellular phones for permitting a handsfree connection therewith, the telephone information and ring tones of the individual cellular phones may be registered in association therebetween. The ring tone generated by the ring tone generation section 8 may be distinguished for every cellular phone.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle handsfree apparatus comprising:
   a handsfree connection section configured to establish a handsfree communication protocol connection with a cellular phone;
   a ring tone reception section configured to receive a ring tone registered in a cellular phone, with which the handsfree connection section establishes a handsfree communication protocol connection;
   a control section configured to
      (i) output by using a reception sound output section a reception sound which is received from a cellular phone, which is under telephone call and with which the handsfree connection section establishes a handsfree communication protocol connection, and
      (ii) output, when a cellular phone with which the handsfree connection section establishes a handsfree communication protocol connection receives an incoming call, a ring tone using a ring tone output section, the ring tone being received by the ring tone reception section from and registered in the cellular phone receiving the incoming call; and
   a ring tone generation section configured to generate a ring tone,
   the control section being further configured to
      (i) establish a handsfree communication protocol connection with a plurality of cellular phones including at least a first cellular phone and a second cellular phone simultaneously, and
      (ii) then output, in case that the second cellular phone receives an incoming call when the first cellular phone is under telephone call,
         (a) a reception sound, which is received from the first cellular phone under the telephone call, via the reception sound output section, and, simultaneously,
         (b) a ring tone, which is generated by the ring tone generation section, via the ring tone output section, without outputting a ring tone, which is received by the ring tone reception section from the second cellular phone and registered in the second cellular phone which is receiving the incoming call.

2. The in-vehicle handsfree apparatus according to claim 1, further comprising:
   a different phone interruption incoming call notice designation portion configured to designate a different phone interruption incoming call notice to be either in a validity mode or in an invalidity mode,
   the control section being further configured to,
      (i) when the different phone interruption incoming call notice is designated to be in the validity mode, output a ring tone, which is generated by the ring tone generation section, via the ring tone output section, and
      (ii) when the different phone interruption incoming call notice is designated to be in the invalidity mode, not output the ring tone, which is generated by the ring tone generation section.

3. The in-vehicle handsfree apparatus according to claim 2, further comprising:
   a different phone incoming call interruption notice selection operation section configured for a user to select either the validity mode or invalidity mode of the different phone incoming call interruption notice,
   the different phone interruption incoming call notice designation portion being further configured to designate either the validity mode or invalidity mode, which is selected by the user using the different phone interruption incoming call notice selection operation section.

4. The in-vehicle handsfree apparatus according to claim 1, wherein
   in case that the incoming call to the second cellular phone continues when the telephone call of the first cellular phone is completed,
   the control section is further configured to output, via the ring tone out section, a ring tone, which is received by the ring tone reception section from the second cellular phone and registered in the second cellular phone which is receiving the incoming call, without outputting the ring tone, which is generated by the ring tone generation section.

5. The in-vehicle handsfree apparatus according to claim 1,
the ring tone generation section being further configured,
in case that the first cellular phone, with which the handsfree connection section establishes the handsfree communication protocol connection, receives an incoming call when the first cellular phone is under the telephone call,
to generate a ring tone different from a ring tone which is transmitted from a communication network.

6. The in-vehicle handsfree apparatus according to claim 1, further comprising:
a ring tone selection operation section configured for a user to operate in order to select a ring tone,
the ring tone generation section being further configured to generate a ring tone, which is selected by the user operating the ring tone selection operation section.

7. A method for an in-vehicle handsfree apparatus to notify an incoming call reaching one of cellular phones, with which the in-vehicle handsfree apparatus establishes a handsfree communication protocol connection, the method comprising:

establishing a handsfree communication protocol connection with a plurality of cellular phones including at least a first cellular phone and a second cellular phone;

receiving a reception sound received from the first cellular phone, which is under telephone call;

receiving a notice of an incoming call along with a registered ring tone from the second cellular phone when the second cellular phone receives the incoming call during the telephone call of the first cellular phone, the registered ring tone being previously registered in the second cellular phone, to thereby generate a ring tone for indicating the incoming call reaching the second cellular phone; and outputting, together with the reception sound received from the first cellular phone, the generated ring tone for indicating the incoming call reaching the second cellular phone, without outputting the registered ring tone received from the second cellular phone, while receiving (i) the reception sound from the first cellular phone under the telephone call and (ii) the notice of the incoming call from the second cellular phone.

* * * * *